United States Patent
Saxena et al.

(10) Patent No.: US 11,256,719 B1
(45) Date of Patent: Feb. 22, 2022

(54) INGESTION PARTITION AUTO-SCALING IN A TIME-SERIES DATABASE

(71) Applicant: Amazon Technologies, Inc., Seattle, WA (US)

(72) Inventors: Gaurav Saxena, Seattle, WA (US); Mustafa Ozan Ozen, Vancouver (CA); Dumanshu Goyal, Seattle, WA (US); Gaurav Gupta, Sammamish, WA (US); Sen Yue, Seattle, WA (US); Nabanita Maji, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 16/455,591

(22) Filed: Jun. 27, 2019

(51) Int. Cl.
*G06F 16/27* (2019.01)
*G06F 16/215* (2019.01)
*G06F 16/2455* (2019.01)

(52) U.S. Cl.
CPC .......... *G06F 16/278* (2019.01); *G06F 16/215* (2019.01); *G06F 16/24568* (2019.01)

(58) Field of Classification Search
CPC . G06F 16/278; G06F 16/24568; G06F 16/215
USPC ...................................................... 707/737
See application file for complete search history.

(56) References Cited

U.S. PATENT DOCUMENTS

| | | | |
|---|---|---|---|
| 8,132,046 B2 | 3/2012 | Varghese | |
| 8,161,448 B1 * | 4/2012 | Croix | G06F 30/367 716/136 |
| 8,276,154 B2 | 9/2012 | Toub et al. | |
| 8,335,765 B2 | 12/2012 | Sivasubramanian et al. | |
| 8,386,540 B1 | 2/2013 | McAlister et al. | |
| 8,595,547 B1 | 11/2013 | Sivasubramanian et al. | |
| 8,601,112 B1 | 12/2013 | Nordstrom et al. | |
| 9,286,001 B2 | 3/2016 | Skjolsvold et al. | |
| 9,449,122 B2 | 9/2016 | Haas et al. | |
| 9,607,019 B1 | 3/2017 | Swift et al. | |
| 9,607,067 B2 | 3/2017 | Haas et al. | |
| 9,626,374 B2 | 4/2017 | Hirsch et al. | |
| 9,672,257 B2 | 6/2017 | Tobin et al. | |
| 9,817,727 B2 | 11/2017 | McAlister et al. | |

(Continued)

OTHER PUBLICATIONS

U.S. Appl. No. 16/116,791, filed Aug. 29, 2018, Mustafa Ozan Ozen.

(Continued)

*Primary Examiner* — Mark E Hershley
(74) *Attorney, Agent, or Firm* — Robert C. Kowert; Kowert, Hood, Munyon, Rankin & Goetzel, P.C.

(57) ABSTRACT

Methods, systems, and computer-readable media for ingestion partition auto-scaling in a time-series database are disclosed. A first set of one or more hosts divides elements of time-series data into a plurality of partitions. A second set of one or more hosts stores the elements of time-series data from the plurality of partitions into one or more storage tiers of a time-series database. An analyzer receives first data indicative of the resource usage of the time-series data at the first set of one or more hosts. The analyzer receives second data indicative of the resource usage of the time-series data at the second set of one or more hosts. Based at least in part on analysis of the first data and the second data, the analyzer initiates a split of an individual one of the partitions into two or more partitions.

20 Claims, 11 Drawing Sheets

(56) References Cited

U.S. PATENT DOCUMENTS

| | | | |
|---|---|---|---|
| 9,836,492 B1 | 12/2017 | Hermanson | |
| 9,934,107 B1 | 4/2018 | Chikkanayakanahally et al. | |
| 10,007,513 B2 | 6/2018 | Malladi et al. | |
| 10,400,583 B1* | 9/2019 | Ricker | G06F 17/10 |
| 10,896,182 B2* | 1/2021 | Bhattacharjee | G06F 16/278 |
| 10,956,415 B2* | 3/2021 | Pal | G06F 16/2425 |
| 10,977,260 B2* | 4/2021 | Pal | G06F 16/285 |
| 10,997,137 B1* | 5/2021 | Goyal | G06F 16/248 |
| 11,023,463 B2* | 6/2021 | Pal | G06F 16/24542 |
| 11,068,537 B1* | 7/2021 | Goyal | G06F 16/278 |
| 2007/0121674 A1* | 5/2007 | Chen | G06Q 10/04 370/468 |
| 2010/0056940 A1* | 3/2010 | Moorman | A61B 5/7264 600/518 |
| 2010/0293196 A1* | 11/2010 | Roy | G06F 16/2471 707/776 |
| 2011/0083046 A1* | 4/2011 | Andrade | G06F 11/0793 714/47.1 |
| 2012/0179791 A1* | 7/2012 | Little | G06F 9/52 709/221 |
| 2013/0110781 A1* | 5/2013 | Golab | G06F 16/275 707/638 |
| 2013/0238795 A1* | 9/2013 | Geffin | G06F 11/3051 709/224 |
| 2014/0297585 A1* | 10/2014 | Chawda | G06F 16/278 707/610 |
| 2014/0310235 A1* | 10/2014 | Chan | G06F 11/3037 707/603 |
| 2014/0310285 A1* | 10/2014 | Chan | G06F 11/0751 707/740 |
| 2015/0032775 A1* | 1/2015 | Yang | G06F 16/2477 707/770 |
| 2015/0178286 A1* | 6/2015 | Dhollander | G05B 19/41875 707/728 |
| 2016/0106331 A1* | 4/2016 | Zorick | A61B 5/16 600/544 |
| 2016/0378809 A1* | 12/2016 | Chen | G06F 16/2455 707/755 |
| 2017/0052536 A1* | 2/2017 | Warner | G06Q 50/06 |
| 2017/0089706 A1* | 3/2017 | Ribeiro | G01R 33/10 |
| 2017/0249376 A1* | 8/2017 | Garvey | G06Q 30/0201 |
| 2018/0188045 A1* | 7/2018 | Wheeler | G06F 16/29 |
| 2019/0065621 A1* | 2/2019 | Boles | G06F 16/22 |
| 2019/0095494 A1* | 3/2019 | Bhattacharjee | G06F 11/3086 |
| 2019/0147086 A1* | 5/2019 | Pal | G06F 16/24545 707/718 |
| 2019/0171676 A1* | 6/2019 | Pal | G06F 16/951 |
| 2020/0167355 A1* | 5/2020 | Rath | G06F 16/2457 |
| 2020/0167360 A1* | 5/2020 | Rath | G06F 3/0644 |
| 2020/0167361 A1* | 5/2020 | Princehouse | G06F 3/067 |

OTHER PUBLICATIONS

U.S. Appl. No. 16/176,629, filed Oct. 31, 2018, Dumanshu Goyal.
U.S. Appl. No. 16/216,580, filed Dec. 11, 2018, Dumanshu Goyal.
U.S. Appl. No. 16/199,078, filed Nov. 23, 2018, Timothy A. Rath.
U.S. Appl. No. 16/199,102, filed Nov. 23, 2018, Lonnie J. Princehouse.
U.S. Appl. No. 16/199,103, filed Nov. 23, 2018, Timothy A. Rath.
U.S. Appl. No. 16/219,686, filed Dec. 13, 2018, Dumanshu Goyal.
U.S. Appl. No. 16/267,330, filed Feb. 4, 2019, Dumanshu Goyal.
U.S. Appl. No. 16/287,822, filed Feb. 27, 2019, Dumanshu Goyal.
U.S. Appl. No. 16/453,914, filed Jun. 26, 2019, Gaurav Saxena.
U.S. Appl. No. 17/349,786, dated Jun. 16, 2021, Sudipto Das.
U.S. Appl. No. 17/349,790, dated Jun. 16, 2021, Sudipto Das.

* cited by examiner

INGESTION PARTITION AUTO-SCALING IN A TIME-SERIES DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
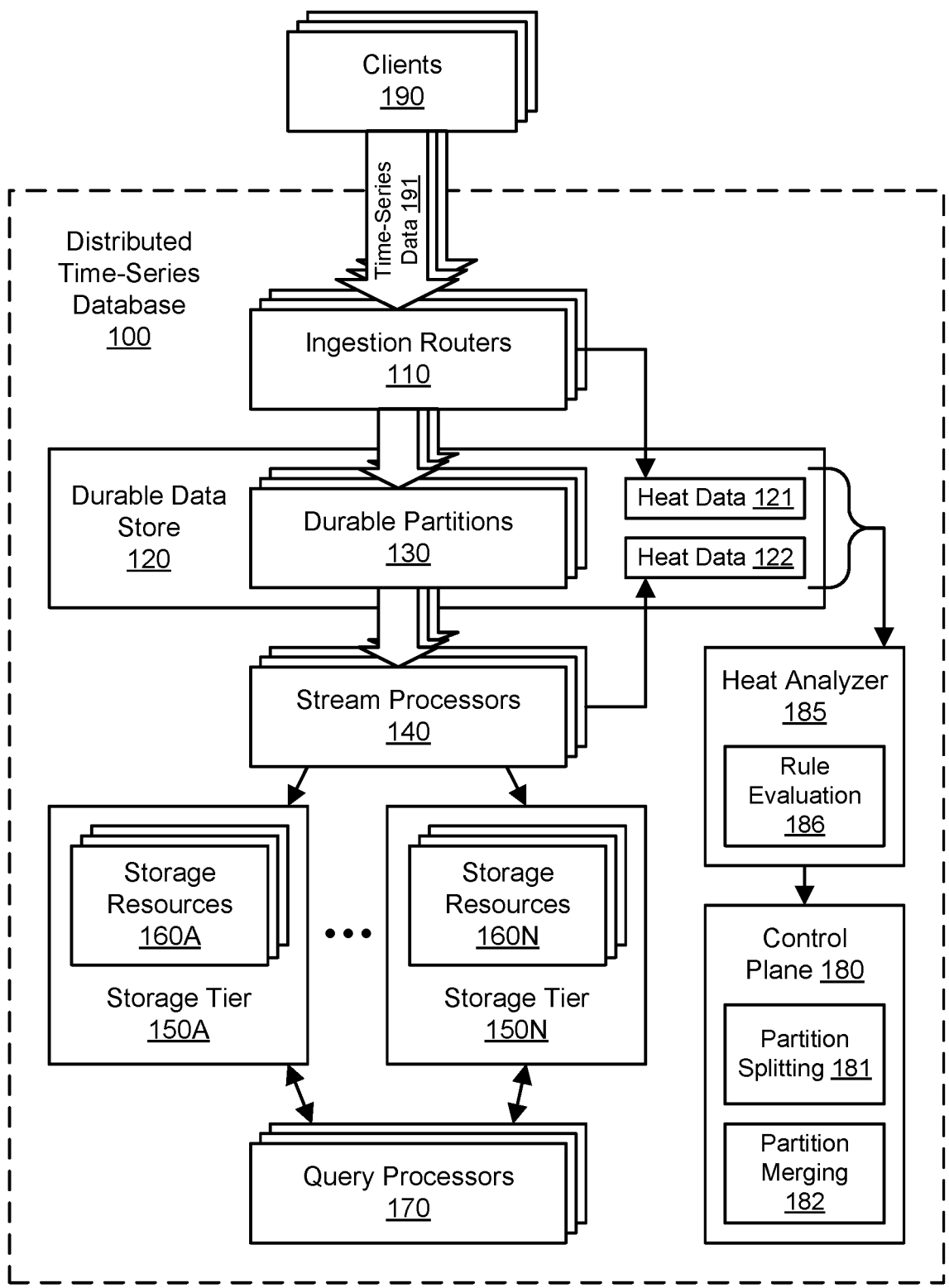
FIG. 1 illustrates an example system environment for ingestion partition auto-scaling in a time-series database, including pushing heat data from hosts to a durable data store and then streaming the heat data to a heat analyzer, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for ingestion partition auto-scaling in a time-series database are described. A time-series database may include a set of ingestion routers that receive and spatially partition time-series data into a set of non-overlapping partitions. The time-series database may also include a set of stream processors, also referred to as writers, which process the time-series data in the partitions. For example, the stream processors may write elements of time-series data to one or more storage tiers, such as a "hot" tier that offers low-latency and high-availability write and read access to a set of distributed storage nodes. The time-series database may further include a set of query processors that perform queries of the time-series data in the one or more storage tiers. The ingestion routers, stream processors, and query processors may be referred to as hosts. The hosts may provide heat data that represents throughput of time-series data or other resource usage by time-series data on a partition-by-partition basis. A central component such as a heat analyzer may analyze the heat data from various hosts for particular partitions and particular windows of time. The heat analyzer may evaluate one or more rules against the heat data and determine whether to trigger a partition split, a partition merge, or a partition defragmentation. Split points for partition splits may be determined based (at least in part) on heat data from ingestion routers and stream processors. A control plane may implement partition splits, partition merges, and partition defragmentation. By auto-scaling ingestion partitions based (at least in part) on heat data, the time-series database may reduce the latency of operations and improve resource usage.

As one skilled in the art will appreciate in light of this disclosure, embodiments may be capable of achieving certain technical advantages, including some or all of the following: (1) reducing the latency of operations in a distributed time-series database by automatically upscaling partitions of time-series data based on analysis of heat data per partition; (2) reducing the use of computational resources in a distributed time-series database by automatically downscaling partitions of time-series data based on analysis of heat data per partition; (3) reducing the use of storage resources in a distributed time-series database by automatically downscaling partitions of time-series data based on analysis of heat data per partition; (4) reducing the use of storage resources in a distributed time-series database by automatically defragmenting partitions of time-series data based on analysis of heat data per partition; (5) reducing the latency of decisions to split and merge partitions by pushing heat data from hosts to a durable data store that streams the heat data to a heat analyzer; (6) protecting storage resources and hosts in a distributed time-series database by rate limiting partition splits and partition merges; and so on.

FIG. 1 illustrates an example system environment for ingestion partition auto-scaling in a time-series database, including pushing heat data from hosts to a durable data store and then streaming the heat data to a heat analyzer, according to some embodiments. A distributed time-series database 100 may ingest and store time-series data 191 and make the stored data available for queries and other computations and tasks. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. By decoupling various stages of the distributed database 100 from each other, individual portions of the database may be scaled up or down by a control plane 180 to make better use of computational and storage resources while permitting near-real-time ingestion and querying of time-series data. In some embodiments, heat data from various hosts in the database 100 may be used to inform scaling decisions for ingestion partitions.

The ingested time-series data 191 may represent a large number of individual time series. An individual time series may include a sequence of values or observations (e.g., for a feature of a system or a phenomenon) that can be plotted over time. An individual time series may be uniquely identified by a set of dimensions such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on. In one embodiment, any change to such a dimension may produce a new time series in the database 100.

The database 100 may manage a large amount of time-series data throughout the lifecycle of the data. The times-series data 191 may be received at the database 100 using a fleet of hosts referred to as ingestion routers 110. The time-series data may typically arrive at the database 100 in time order, but the database may be able to ingest out-of-order data as well. The ingestion routers 110 may divide the data 191 from the clients 190 into non-overlapping ingestion partitions 130. In one embodiment, the ingested data may be spatially partitioned along non-overlapping spatial boundaries according to the time series or range of the data, one or more tags associated with the data, the region that produced the data, the category to which the data belongs, and/or other suitable metadata. Ingested time-series data may be mapped to different partitions based on hierarchical clustering in order to achieve better performance of data storage and retrieval. A partition may include one time series or multiple time series.

The ingestion partitions 130 may be maintained using persistent storage resources and may be termed durable partitions. In various embodiments, the durable partitions 130 may be provided by a streaming service or other durable data store 120. The streaming service or durable data store 120 may also be referred to as a journal. The streaming service or durable data store 120 may use shards or other divisions to implement the non-overlapping partitions 130. The use of the durable partitions 130 as a staging area may permit the database 100 to decouple ingestion from stream processing and storage. Acknowledgements of requests to add time-series data elements may be sent to the clients 190 upon the successful addition of time-series data elements to the partitions 130.

In addition to the ingestion routers 110, the database 100 may include hosts such as stream processors 140 and query processors 170. A fleet of stream processors 140 may take the time-series data from the durable partitions 130, potentially process the data in various ways, and add the data to one or more storage tiers 150A-150N. For example, one stream processor may write data from one partition to a "hot" storage tier, and another stream processor may write data from the same partition to a "cold" storage tier. In various embodiments, stream processors may perform reordering, deduplication, aggregation of different time periods, and other transformations on time series data. Stream processors 140 may perform tasks such as creating materialized views or derived tables based on a partition, such as an aggregation or rollup of a time interval. The tasks may include continuous queries that are performed repeatedly over time, e.g., to create aggregations for each hour or day of a time series as that time period is finalized.

The data 191 may be routed from the durable partitions 130 to the stream processors 140 according to routing metadata, e.g., that maps different time series or ranges of the data to different stream processors. In one embodiment, a given stream processor may be assigned to one and only one partition at a time. In one embodiment, the stream processors 140 may organize the time series in tables. The stream processors 140 may also be referred to as writers or table builders. A table may store one or more time series. A table may be a named entity that stores related time series that are usable by the same application. A data point (e.g., an element) in a time series may be stored in a record. Data points or elements of time-series data may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, dimensions may be indexed for use in queries, and queries may specify time intervals and/or dimensions rather than individual measures.

The database 100 may adapt to varying throughput quickly and dynamically, e.g., such that clients can begin providing time-series data without prior allocation of hosts and storage resources. In some embodiments, the control plane 180 may dynamically increase or decrease the number of partitions based (at least in part) on the amount or rate of ingestion of time-series data or on other metrics indicating resource usage. As shown in FIG. 1, to perform auto-scaling of the ingestion partitions 130, the control plane 180 may include a component 181 for partition splitting and a component 182 for partition merging. Similarly, the control plane 180 may dynamically increase or decrease the number of ingestion routers 110 based (at least in part) on the amount or rate of ingestion of time-series data or on other metrics indicating resource usage. In one embodiment, as the number of partitions increases or decreases based on the amount or rate of ingestion, the number of stream processors may also tend to increase or decrease dynamically. The partition splitting 181 and partition merging 182 may be requested by a heat analyzer 185.

The ingestion routers 110 may produce heat data 121 that is provided to the heat analyzer 185 and used to make decisions regarding partition auto-scaling. The stream processors 140 may also produce heat data 122 that is provided to the heat analyzer 185 and used to make decisions regarding partition auto-scaling. In various embodiments, storage resources 150A-150N and/or query processors 170 may also produce heat data that is provided to the heat analyzer 185 and used to make decisions regarding partition auto-scaling. The heat data 121 and 122 may indicate resource usage, throughput, or other usage metrics associated with time-series data in particular partitions at particular hosts. For example, the heat data 121 may indicate how many bytes of time-series data were written to a particular ingestion partition over a particular window of time. As another example, the heat data 121 may indicate a transaction count or rate for a particular ingestion partition over a particular window of time. As a further example, the heat data 122 may indicate the throughput for a particular ingestion partition over a particular window of time. In one embodiment, the heat data 121 and 122 may include a time dimension and may itself represent time-series data. In one embodiment, the heat data 122 may represent rollups or aggregations over particular windows of ingestion time by the stream processors 140.

In one embodiment, as shown in FIG. 1, the heat data 121 and 122 may be pushed by the various hosts to the streaming service or durable data store 120. The heat data 121 and 122 may be pushed periodically, e.g., every second. The heat data 121 and 122 may be stored persistently at the durable data store 120 so that the hosts that produce the heat data do not have to store it persistently. In one embodiment, the durable data store 120 may stream the heat data 121 and 122 to the heat analyzer 185, e.g., using a single stream. By decoupling the analyzer 185 from the producers of heat data using the durable data store 120, the partition auto-scaling may be performed efficiently and with low latency. In one embodiment, the heat analyzer 185 may be unaware of the various hosts that generate the heat data, and the heat analyzer 185 may reach a decision regarding auto-scaling for a partition without necessarily receiving all the available heat data associated with that partition. In various embodiments, the heat analyzer 185 may be implemented using one analyzer host that analyzes all the heat data for the database 100 or a plurality of analyzer hosts that operate on different portions of the heat data concurrently, with a given partition assigned to only one analyzer host.

Partitions splits and partition merges may be triggered based (at least in part) on analysis of per-partition heat data by the heat analyzer 185. Partition splits and partition merges may be triggered through evaluation of heat data from heterogeneous sources in the database 100, e.g., ingestion routers that partition ingested data as well as stream processors that store or transform the partitioned data. The heat data from a downstream host (e.g., a stream processor) may influence the partitioning at an upstream host (e.g., an ingestion router). The analyzer 185 may send requests for partition splits and partition merges to the control plane 180. In some embodiments, the analyzer 185 and/or control plane 180 may implement one or more rate limits to limit the number of splits or merges performed over a period of time. For example, the control plane 180 may permit one partition split per minute for a particular ingestion partition or analyzer host or set of analyzer hosts. Requests that exceed a rate limit may be placed in a request queue or otherwise delayed. In one embodiment, requests for partition splits and partition merges may be performed according to differing priorities associated with the requests. For example, partition splits may be assigned a higher priority than partition merges so that minimizing the latency of ingestion is prioritized over minimizing resource usage.

The analyzer 185 may include a component 186 for rule evaluation that evaluates one or more rules against heat data. For example, a rule may trigger a partition split if the heat data 121 for a partition indicates that a bytes-written threshold for the partition was exceeded for bytes written by the ingestion routers 110 over a recent window of time. As another example, a rule may trigger a partition split if the heat data 122 for a partition indicates that the available throughput at a stream processor associated with the partition was less than some threshold. As yet another example, a rule may trigger a partition merge if the heat data 121 and/or 122 for two partitions indicates they had throughput less than a threshold amount over a recent window of time. In one embodiment, a partition split or partition merge may be triggered by one rule being matched by the heat data. In one embodiment, a partition split or partition merge may be triggered by more than one rule being matched by the heat data. In one embodiment, a partition may be split into two partitions. In one embodiment, a partition may be split into three or more partitions. The split point for a partition split may be determined using heat data from the stream processor associated with the partition, e.g., to spread the heat evenly between the partitions resulting from the split. In one embodiment, two partitions may be merged into a single partition. In one embodiment, three or more partitions may be merged into a single partition.

By using heat data from both ingestion routers 110 and stream processors 140, the heat analyzer 185 may make more intelligent auto-scaling decisions that take into account the full picture of the heat of a partition at multiple stages of the database 100. For example, by using heat data from both ingestion routers 110 and stream processors 140, the heat analyzer 185 may prevent ingestion routers from being starved and the stream processors from providing inaccurate heat data. The heat analyzer 185 may use the heat data to determine the distribution of heat within a particular partition, and that distribution may influence partition merges and splits so that the heat is distributed more evenly. Elements of time-series data may be identified by keys, and the heat distribution for a partition may indicate the heat per key (or per hashes of the keys). The analyzer 185 may attempt to find a median point of the heat and split a partition at that point. If the analyzer 185 determines that one table in a partition is particularly hot, then the analyzer may isolate that table in a partition split. In some embodiments, the analyzer 185 may use machine-learning techniques to learn patterns in heat data that trigger splits and merges. The analyzer 185 may then trigger anticipatory splits and merges based (at least in part) on recognizing those patterns in new heat data.

The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. As another example, the database 100 may include a cold tier that offers higher latency (but a lower cost) by storing a longer interval of time-series data using persistent storage resources such as disk drives. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits users (e.g., developers of applications) and other systems to perform management and modeling of time series data. For example, a component 181 for time-series data management of the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, for example, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, clients 190 may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. Query processors 170 may perform tasks such as one-time queries of time-series data in one or more storage tiers 150A-150N, transformations of time-series data, and other computations. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100. In one embodiment, the query processors 170 may produce heat data that is used by the heat analyzer.

In one embodiment, one or more components of the distributed database 100, such as hosts 110, 140 and 170, other compute instances, and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, durable partitions 130, stream processors 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants)

simultaneously, the provider network may be said to offer multi-tenancy and may be termed a multi-tenant provider network. In one embodiment, portions of the functionality of the provider network, such as the distributed database 100, may be offered to clients in exchange for fees.

In one or more of the storage tiers such as tier 150A, the time-series data may be partitioned into a set of tiles along non-overlapping temporal and spatial boundaries. A tile may thus represent a partition of time-series data within a time range (between a starting time and an ending time) and within a range of keys. The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a server-side consensus mechanism.

Figure 7:
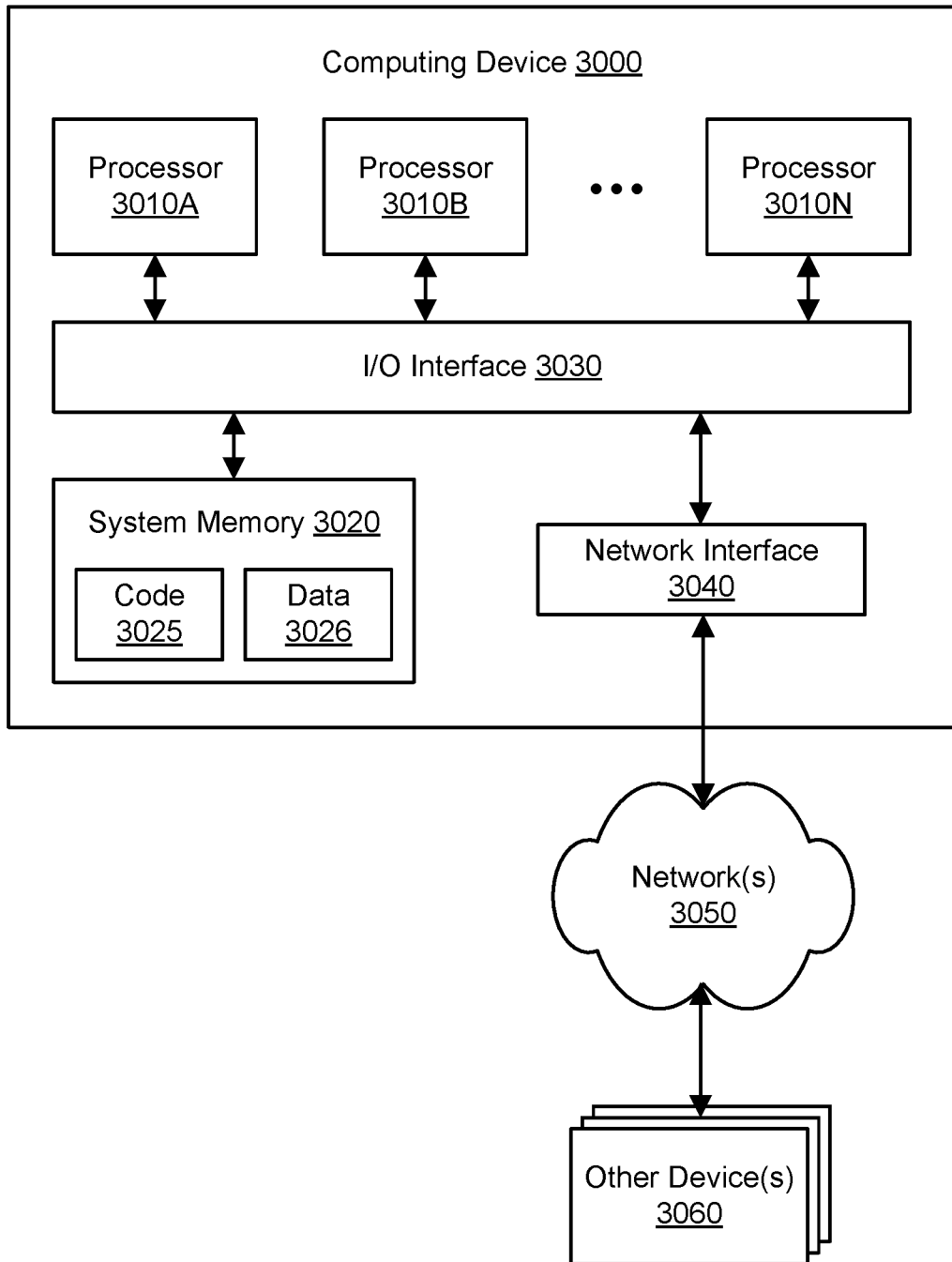
FIG. 7 illustrates an example computing device that may be used in some embodiments.

In various embodiments, components of the distributed database 100, such as the ingestion routers 110, streaming service 120, stream processors 140, storage resources 160A-160N, query processors 170, heat analyzer 185, and/or control plane 180 may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. In one embodiment, the client devices may be implemented using any suitable number and configuration of computing devices, any of which may be implemented by the example computing device 3000 illustrated in FIG. 7. Clients 190 may convey network-based service requests to the ingestion router fleet 110 via one or more networks, e.g., to supply a stream of data for processing using the stream processors 140 and storage in the storage tiers 150A-150N. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
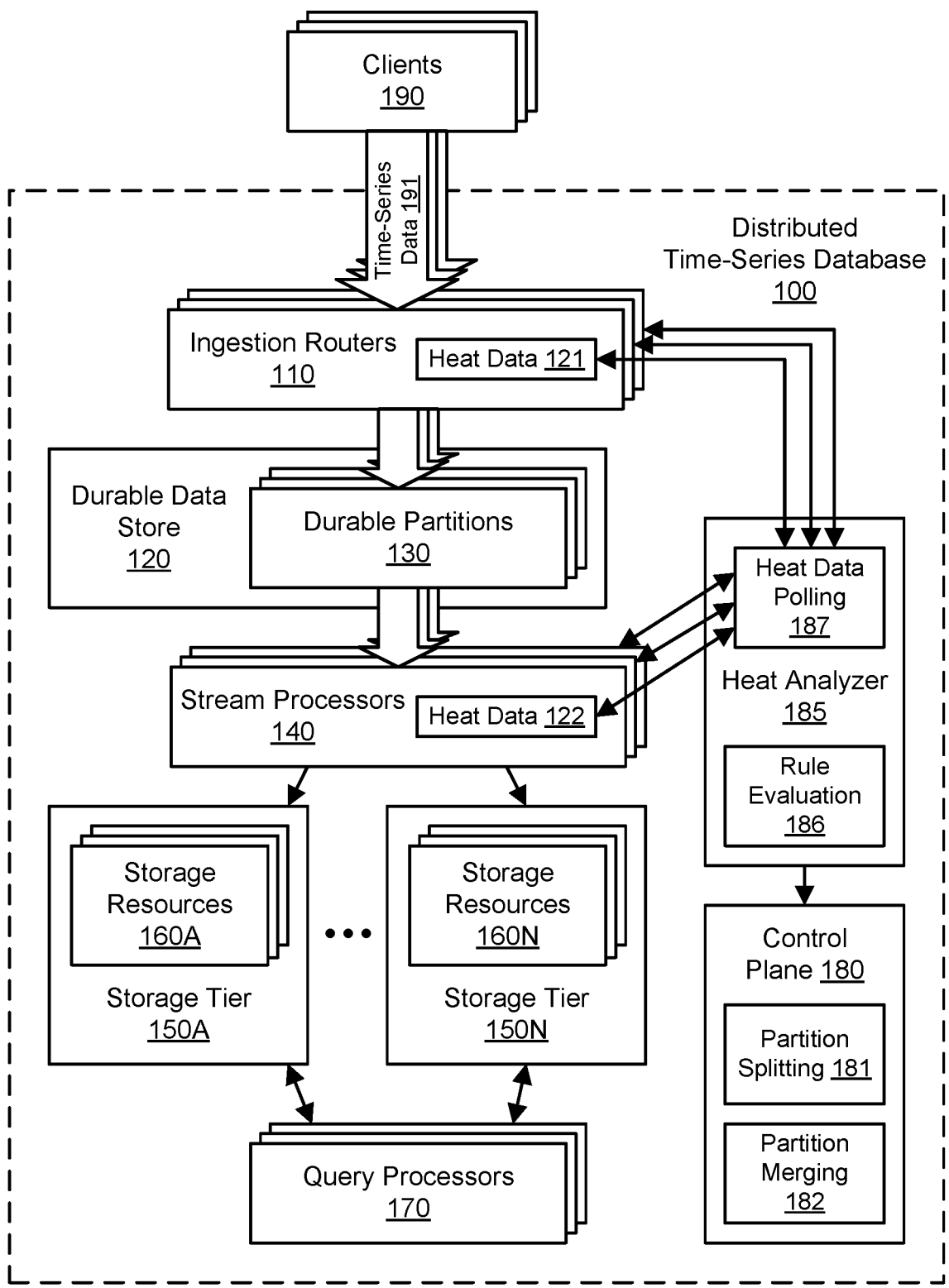
FIG. 2 illustrates an example system environment for ingestion partition auto-scaling in a time-series database, including a heat analyzer polling hosts for heat data, according to some embodiments.

FIG. 2 illustrates an example system environment for ingestion partition auto-scaling in a time-series database, including a heat analyzer polling hosts for heat data, according to some embodiments. In one embodiment, instead of decoupling the heat analyzer 185 from the hosts that produce the heat data using the durable data store 120, the heat analyzer may obtain the heat data directly from the hosts. As shown in FIG. 2, heat data 121 may be persisted on the ingestion routers 110 that produce that data, and the analyzer 185 may use a component 187 for heat data polling to periodically ask the ingestion routers 110 for the heat data 121. Similarly, heat data 122 may be persisted on the stream processors 140 that produce that data, the analyzer 185 may use the component 187 for heat data polling to periodically ask the stream processors 140 for the heat data 122. The example system environment shown in FIG. 2 may permit decentralized buffering of heat data using the various hosts 110 and 140.

Figure 3:
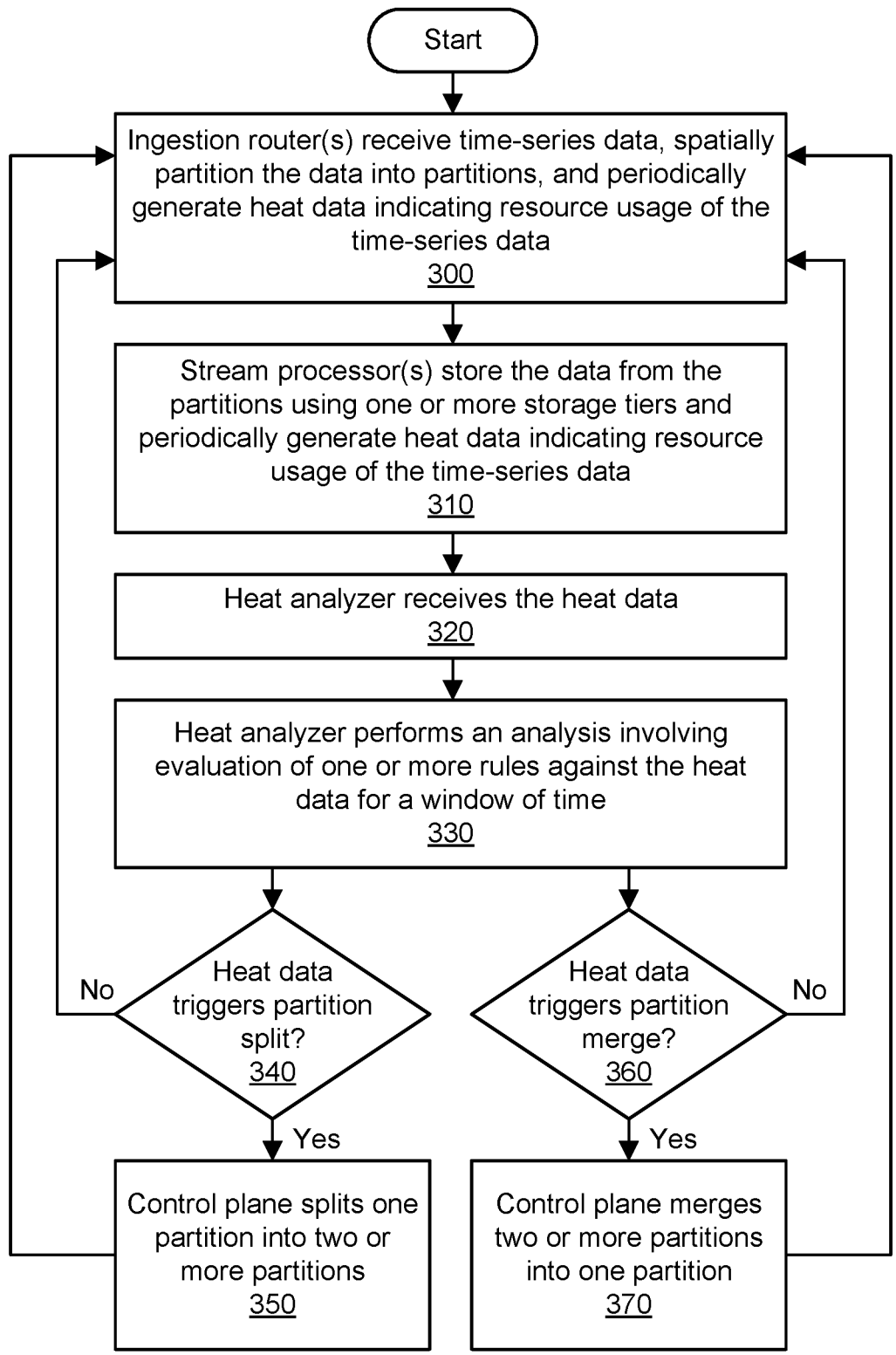
FIG. 3 is a flowchart illustrating a method for ingestion partition auto-scaling in a time-series database, according to some embodiments.

FIG. 3 is a flowchart illustrating a method for ingestion partition auto-scaling in a time-series database, according to some embodiments. As shown in 300, one or more ingestion routers may receive time-series data from clients. The ingestion router(s) may divide the time-series data into a plurality of non-overlapping partitions on a spatial dimension. The ingestion router(s) may periodically generate heat data for particular partitions. The heat data may indicate throughput or other resource usage metrics associated with time-series data in particular partitions at the ingestion router(s). For example, the heat data may indicate how many bytes of time-series data were written to a particular ingestion partition by an ingestion router over a particular window of time. As another example, the heat data may indicate a transaction count or rate for a particular ingestion partition at an ingestion router over a particular window of time.

As shown in 310, one or more stream processors may store the data from the partitions using one or more storage tiers. Like the ingestion router(s), the stream processor(s) may periodically generate heat data for particular partitions. The heat data may indicate throughput or other resource usage metrics associated with time-series data in particular partitions at the stream processor(s). For example, the heat data may indicate the throughput for a particular ingestion partition at a stream processor over a particular window of time.

As shown in 320, a heat analyzer may receive the heat data produced by the ingestion router(s) and stream processor(s). In one embodiment, the heat data may be pushed by the various hosts to a streaming service or durable data store, e.g., every second. In one embodiment, the durable data store may stream the heat data to the heat analyzer. By decoupling the analyzer from the producers of heat data using the durable data store, partition auto-scaling may be performed efficiently and with low latency. In one embodiment, the heat analyzer may be unaware of the various hosts that generate the heat data, and the heat analyzer may reach a decision regarding auto-scaling for a partition without necessarily receiving all the available heat data associated with that partition.

As shown in 330, the heat analyzer may perform an analysis of the heat data to determine whether any partitions splits and/or partition merges should be triggered. The analysis may be performed per partition using heat data for a particular window of time. The analysis may include evaluation of one or more rules against the heat data, based (at least in part) on analysis of per-partition heat data by the heat analyzer, to determine whether the rules are matched by the heat data. For example, a matched rule may trigger a partition split if the heat data for a partition indicates that a bytes-written threshold for the partition was exceeded for bytes written by the ingestion router(s) over a recent window of time. As another example, a matched rule may trigger a partition split if the heat data for a partition indicates that the available throughput at a stream processor associated with the partition was less than some threshold. As yet another example, a matched rule may trigger a partition merge if the heat data for two partitions indicates they had throughput less than some threshold amount over a recent window of time.

As shown in 340, the method may determine whether the heat data triggers a partition split. If not, then the method may continue with additional ingestion and corresponding heat data generation as shown in 300. If so, then as shown in 350, the analyzer may send a request for a partition split to a control plane, and the control plane may perform the requested split. The split may divide an existing partition into two or more partitions. The split boundary may be determined by the heat analyzer using the heat data and may be communicated to the control plane.

As shown in 360, the method may determine whether the heat data triggers a partition merge. If not, then the method may continue with additional ingestion and corresponding heat data generation as shown in 300. If so, then as shown in 370, the analyzer may send a request for a partition merge to the control plane, and the control plane may perform the requested merge. The split may combine two or more partitions into a merged partition.

Figure 4:
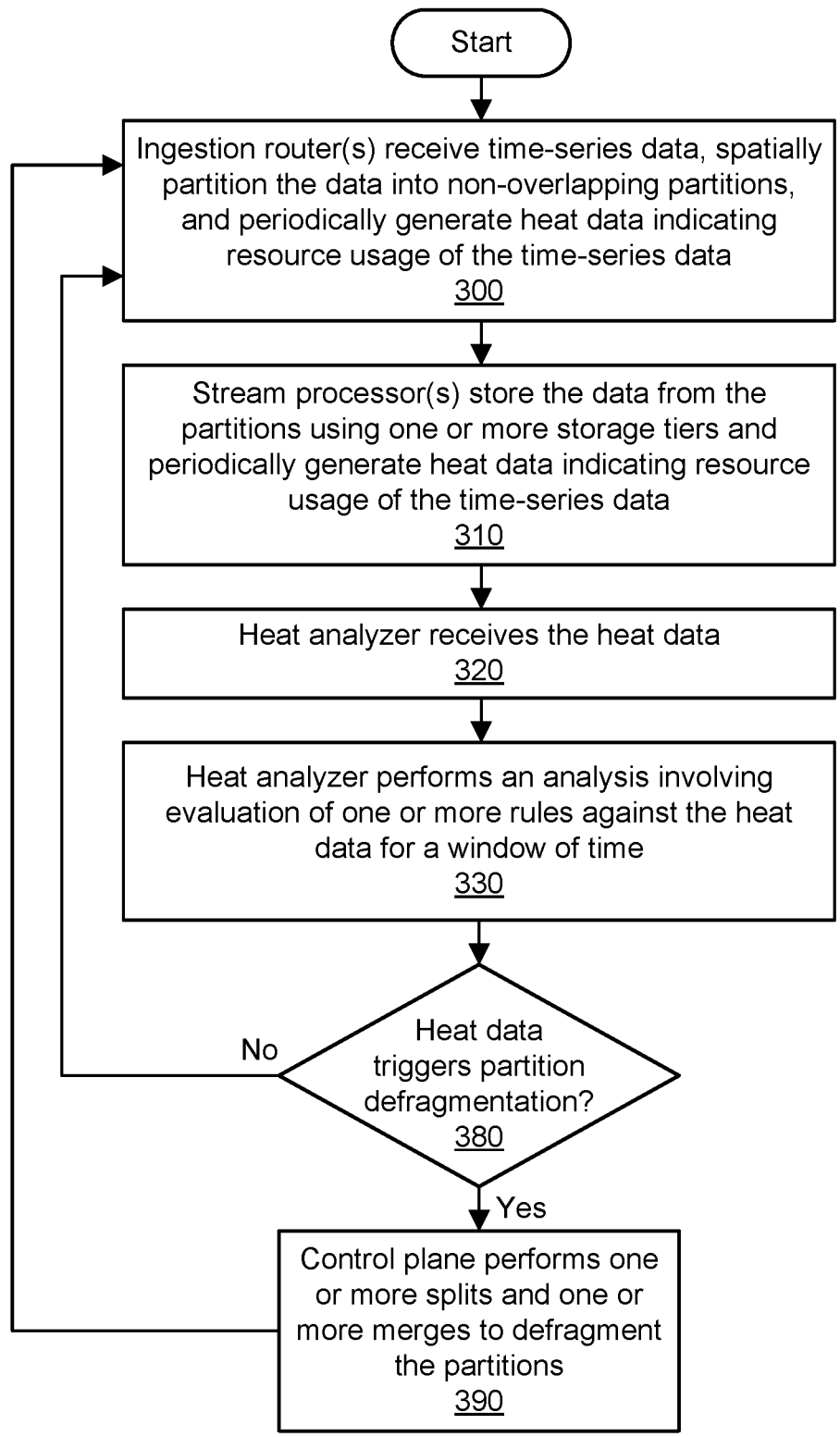
FIG. 4 is a flowchart illustrating a method for ingestion partition defragmenting in a time-series database, according to some embodiments.

FIG. 4 is a flowchart illustrating a method for ingestion partition defragmenting in a time-series database, according to some embodiments. In addition to simple splits and simple merges, the database 100 may perform defragmentation of the ingestion partitions to distribute heat more evenly among the partitions. Defragmentation may include both splitting and merging. For example, to distribute heat more evenly, one hot partition may be split into two sub-partitions, and each of those sub-partitions may be merged with colder partitions. As shown in 330, the heat analyzer may perform an analysis of the heat data to determine whether partition defragmentation should be performed. As shown in 380, the method may determine whether the heat data triggers a partition defragmentation. If not, then the method may continue with additional ingestion and corresponding heat data generation as shown in 300. If so, then as shown in 390, the analyzer may send a request for a partition defragmentation to a control plane, and the control plane may perform the requested defragmentation. The defragmentation may include one or more splits and one or more merges and may produce the same or a different number of partitions as before the defragmentation. However, the boundaries of the partitions with respect to the spatial dimension may differ from the boundaries prior to the defragmentation.

Figure 5A:
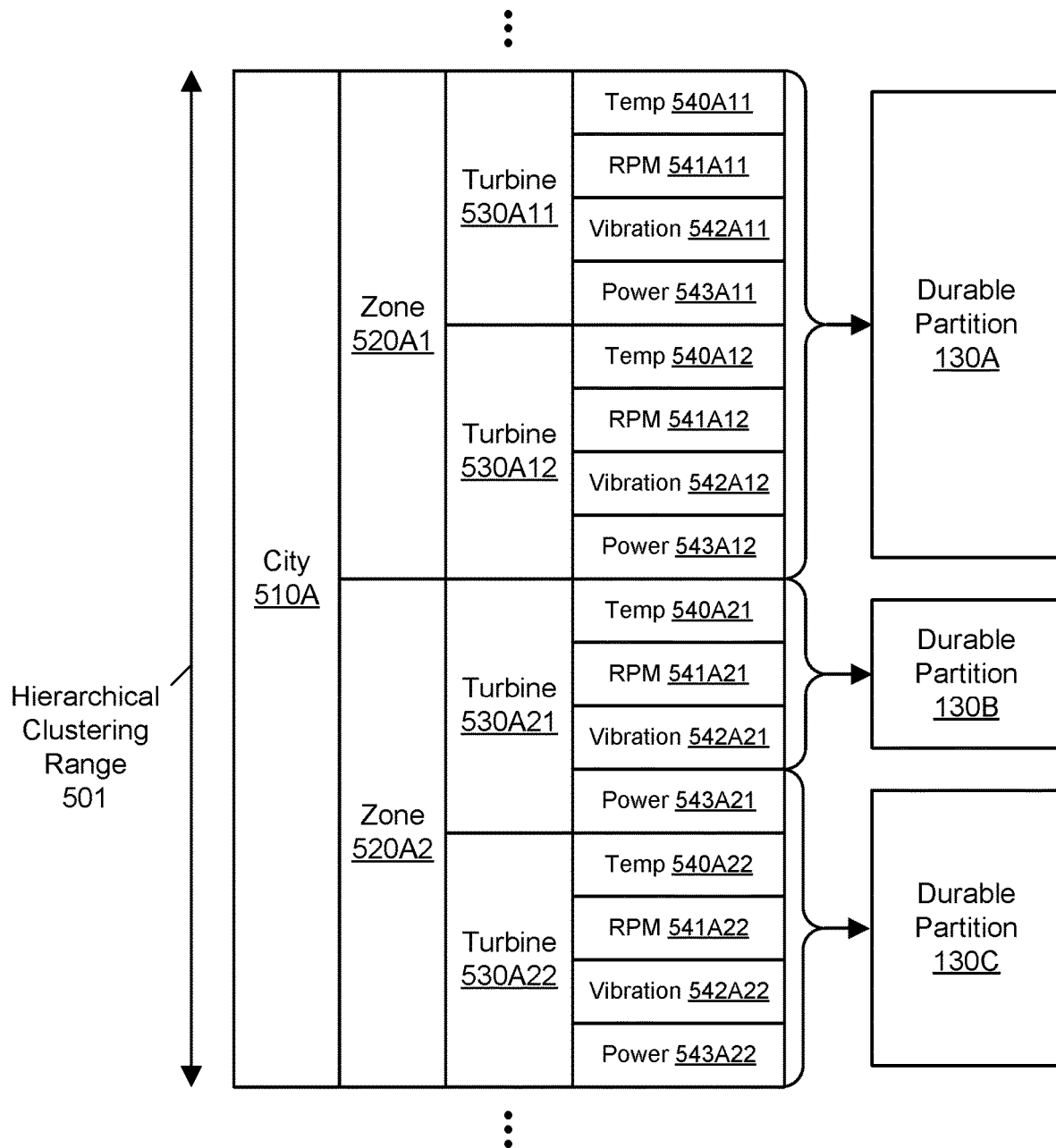
FIG. 5A illustrates an example of hierarchical clustering of ingested time-series data, according to some embodiments.

FIG. 5A illustrates an example of hierarchical clustering of ingested time-series data, according to some embodiments. The ingestion routers 110 may organize time-series data along a hierarchical clustering range 501. Some time series may be related to other time series via a hierarchy. Using hierarchical clustering, related time series may be placed near each other throughout their lifecycle in the time-series database 100. The use of hierarchical clustering may achieve a higher degree of compression for time-series data as well as lower latency for queries. The hierarchy may be specified by clients 190 or may be inferred automatically using contextual information, such as the geographical proximity of different time series, the generation of different time series by the same client device, and so on. The ingestion routers 110 may tag incoming data points so that hierarchically related series are co-located properly. A hash-based clustering scheme may be used at various stages of the database 100 to enforce the hierarchical clustering. The hash-based clustering scheme may have multiple levels.

As shown in the example of FIG. 5A, an example of a hierarchical relationship path for client devices representing wind-turbine sensors may be Country, State, City, Zone, Wind Turbine, and Metric. A portion of data having this hierarchical scheme may include data for a particular city 510A, two zones 520A and 520A32, and two turbines per zone 530A11, 530A12, 530A21, and 530A22. Turbine 530A11 may include measurements for temperature 540A11, RPM 541A11, vibration 542A11, and power 543A11. Turbine 530A12 may include measurements for temperature 540A12, RPM 541A12, vibration 542A12, and power 543A12. Turbine 530A21 may include measurements for temperature 540A21, RPM 541A21, vibration 542A21, and power 543A21. Turbine 530A22 may include measurements for temperature 540A22, RPM 541A22, vibration 542A22, and power 543A22. A hash-based clustering scheme supporting this hierarchy may co-locate all measurements for a given wind turbine, all wind turbines for a given zone, and so on. In one embodiment, all metrics of all wind turbines in a zone/city/state may be clustered together. In one embodiment, the hierarchical clustering may be changed over time and in response to query workloads in order to reduce the latency of queries. For example, the example data of FIG. 5A may be reorganized (for future data points) with temp, RPM, vibration, and power as higher-level constructs than the turbine identifiers.

The data points for the hierarchy shown in FIG. 5A may be mapped to various durable partitions by the ingestion routers 110. As shown in the example, the time-series data may be mapped and routed to partitions 130A, 130B, and 130C. In one embodiment, different numbers of time series may be mapped to different partitions based (at least in part) on the ingestion rate of those time series. Partitions may be split or merged as appropriate to adapt to changing ingestion rates for various time series. Each durable partition may support streaming. A particular partition may be mapped to a particular stream processor, e.g., for writing data from the partition to a particular storage tier. In one embodiment, partitions 130A-130C may represent shards of a durable data store or streaming service 120. In one embodiment, partitions 130A-130C may represent database tables or other durable storage resources.

Figure 5B:
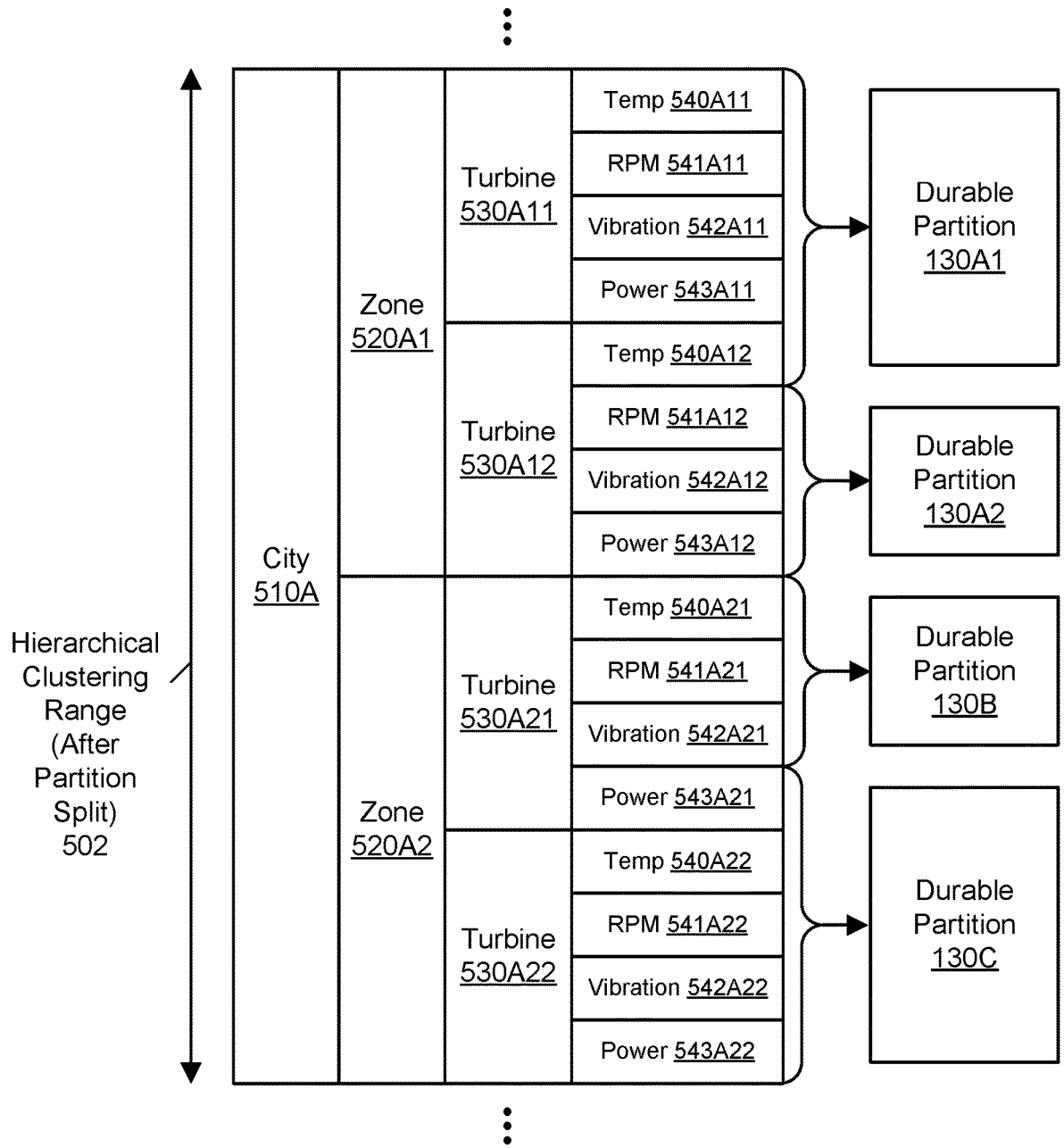
FIG. 5B illustrates an example of hierarchical clustering of ingested time-series data after a partition split, according to some embodiments.

FIG. 5B illustrates an example of hierarchical clustering of ingested time-series data after a partition split, according to some embodiments. As discussed above, partitions may be split based (at least in part) on analysis of per-partition heat data by a heat analyzer 185. In one embodiment, a partition may be split into two partitions. In one embodiment, a partition may be split into three or more partitions. As shown in the example of FIG. 5B, the partition 130A may be split into two partitions 130A1 and 130A2 based (at least in part) on the heat data for partition 130A. For example, the heat data for partition 130A may have indicated that one or more ingestion routers and/or a stream processor associated with the partition 130A had throughput that exceeded a threshold or availability lower than a threshold for the most recent window of time. As another example, the heat data for partition 130A from one or more query processors may have indicated that the one or more query processors had query throughput that exceeded a threshold or availability lower than a threshold for the most recent window of time. The split point for the partition split may be determined using heat data from the stream processor associated with the partition 130A. The split point may be determined between two measurements (e.g., temperature 540A12 and RPM 541A12) on the hierarchical clustering range 502.

Figure 5C:
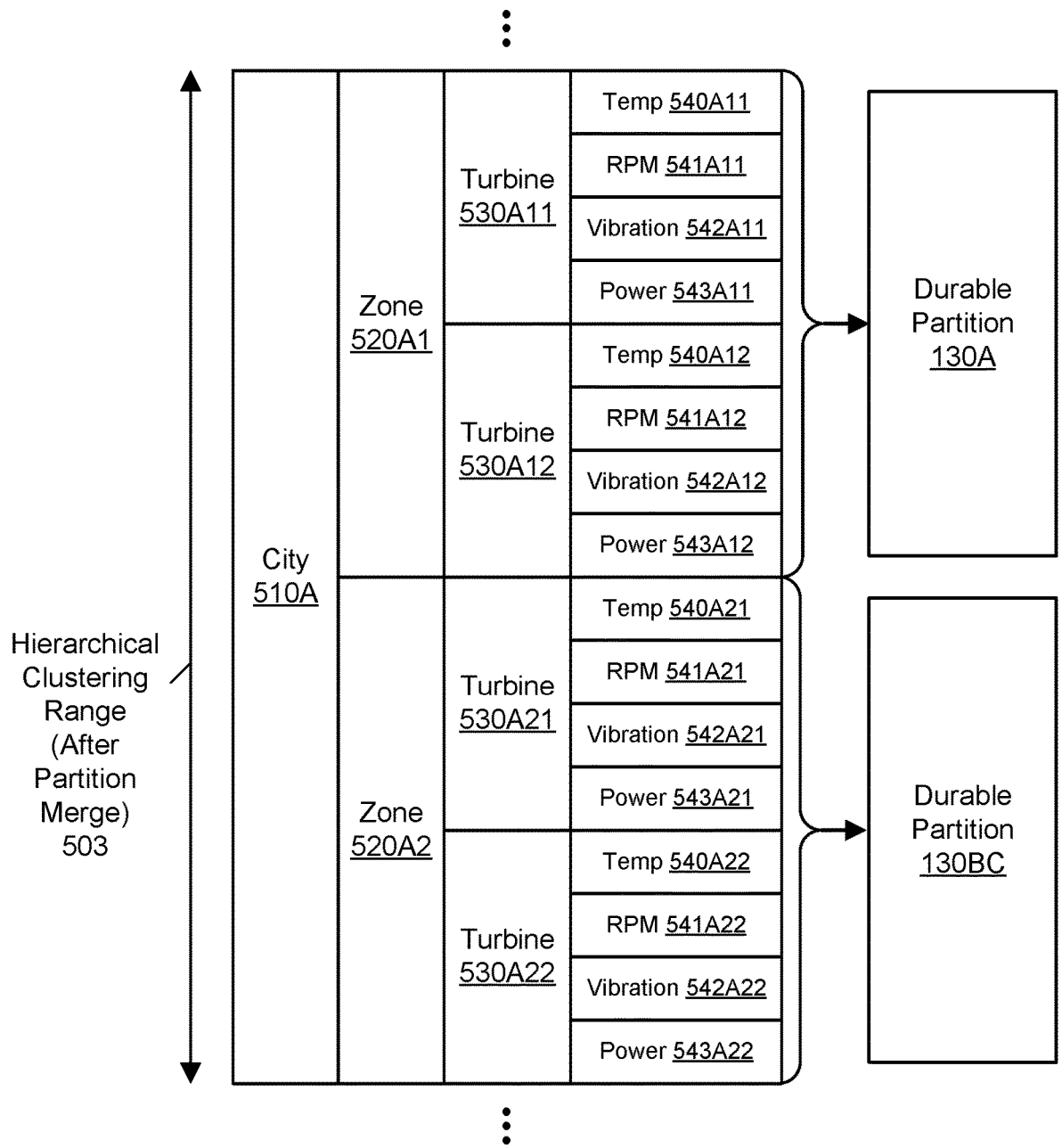
FIG. 5C illustrates an example of hierarchical clustering of ingested time-series data after a partition merge, according to some embodiments.

FIG. 5C illustrates an example of hierarchical clustering of ingested time-series data after a partition merge, according to some embodiments. As discussed above, partitions may be merged based (at least in part) on analysis of per-partition heat data by a heat analyzer 185. In one embodiment, two partitions may be merged into a single partition. In one embodiment, three or more partitions may be merged into a single partition. As shown in the example of FIG. 5C, the partitions 130B and 130C may be merged into a partitions 130BC based (at least in part) on the heat data for partitions 130B and 130C. For example, the heat data for partitions 130B and/or 130C may have indicated that one or more ingestion routers and/or a stream processor associated with the partition 130B or 130C had throughput lower than a threshold or availability higher than a threshold for the most recent window of time. The two merged partitions 130B and 130C may be adjacent on the hierarchical clustering range 503.

Figure 6A:
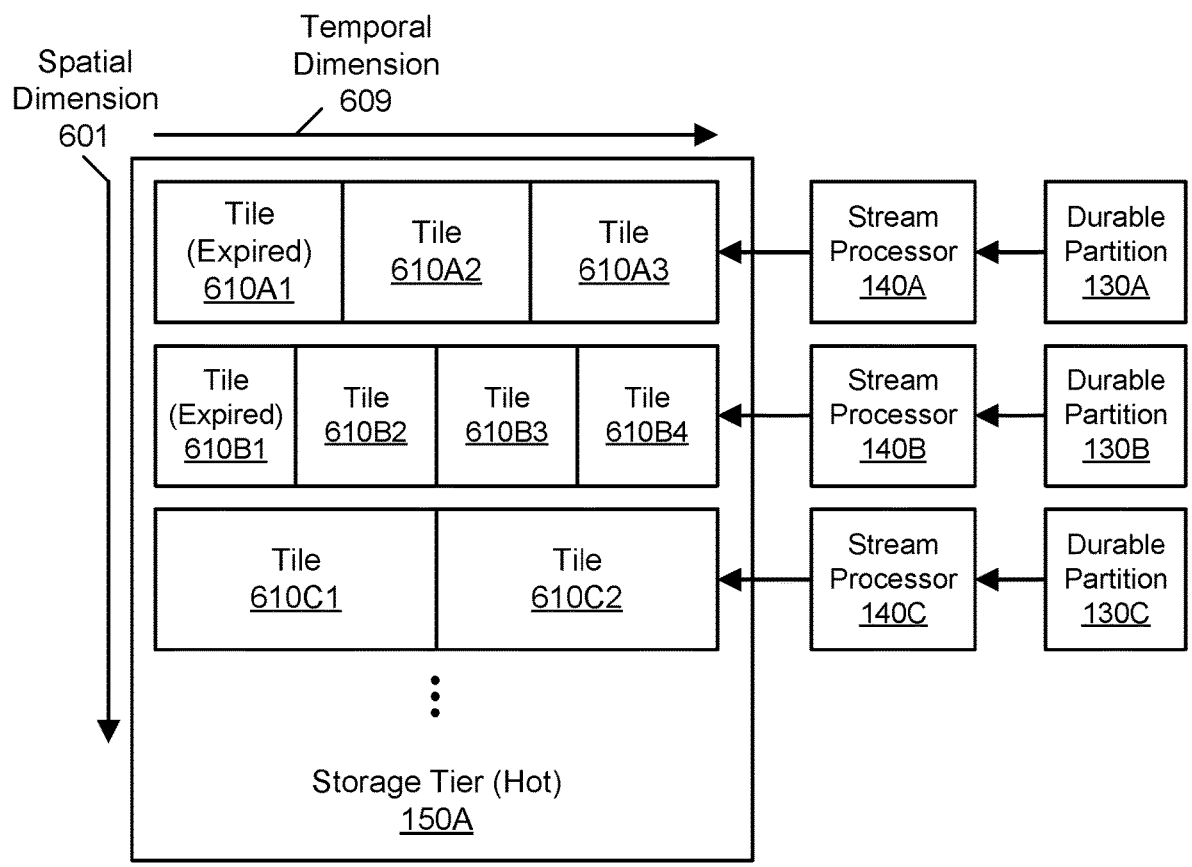
FIG. 6A illustrates an example of storage of time-series data using two-dimensional tiles in a hot tier, according to some embodiments.

FIG. 6A illustrates an example of storage of time-series data using two-dimensional tiles in a hot tier, according to some embodiments. As discussed above, the database 100 may include a hot storage tier such as tier 150A that stores recent data with high availability and low latency. In one embodiment, the hot tier 150A may include a set of storage hosts or storage nodes that include computational resources and memory resources. The storage nodes may store time-series data using tiles that are generated or appended to by stream processors. Tiles may be stored using storage resources such as memory (e.g., RAM) and/or solid-state drives for lower latency of storage and retrieval. Tiles may be replicated across different nodes (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on hierarchical clustering that seeks to co-locate related measurements and/or time series in the same partition, and the hierarchical clustering may be performed by the ingestion routers 110. Tiles may also be partitioned along non-overlapping temporal boundaries. Due to the spatial dimension 601 and the temporal dimension 609, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ.

In the example of FIG. 6A, a set of time series may be mapped to durable partitions 130A, 130B, and 130C based on a spatial range (e.g., hierarchical clustering). Particular partitions may be mapped to particular stream processors for writing data from the partitions to the hot tier 150A. For example, partition 130A may be assigned to stream processor 140A that writes to the hot tier, partition 130B may be assigned to stream processor 140B that writes to the hot tier, and partition 130C may be assigned to stream processor 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the stream processor for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion. As shown in the example of FIG. 6A, stream processor 140A may write to an open tile 610A3 that was preceded in time by a tile 610A2 that was preceded in time by a now-expired tile 610A. Similarly, stream processor 140B may write to an open tile 610B4 that was preceded in time by a tile 610B3 that was preceded in time by a tile 610B2 that was preceded in time by a now-expired tile 610B1. Additionally, stream processor 140C may write to an open tile 610C2 that was preceded in time by a tile 610C1. As discussed above, the contents of a tile may be replicated (e.g., using three replicas) across different location or zones to achieve greater durability of the hot tier.

Figure 6B:
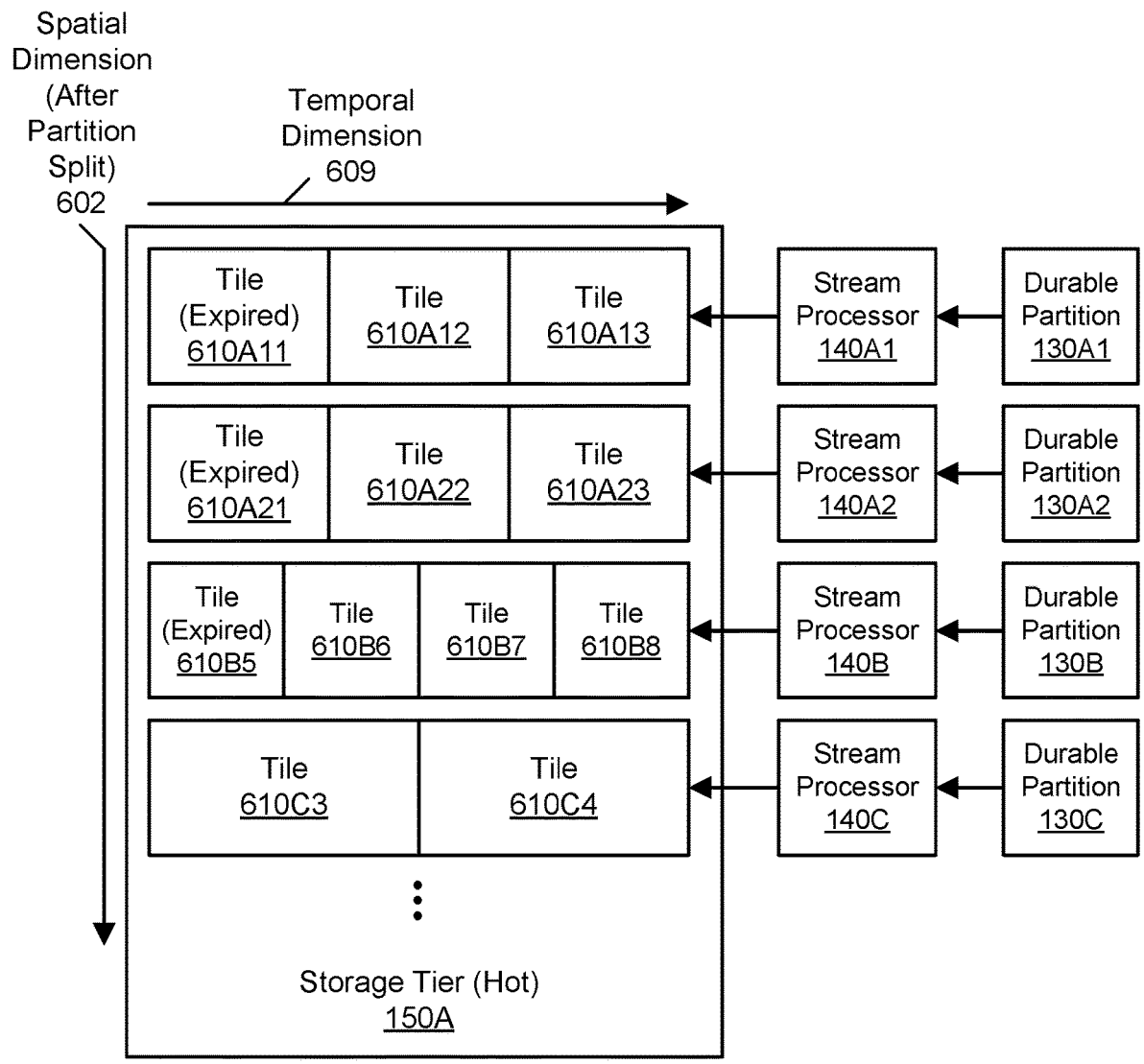
FIG. 6B illustrates an example of storage of time-series data using two-dimensional tiles in a hot tier after a partition split, according to some embodiments.

FIG. 6B illustrates an example of storage of time-series data using two-dimensional tiles in a hot tier after a partition split, according to some embodiments. As discussed above with respect to FIG. 5B, an ingestion partition 130A may be split into two ingestion partitions 130A1 and 130A2. The ingestion partition split may be carried forth into the stream processors 140 and storage tiers 150A-150N. As discussed above, a particular ingestion partition may be assigned to one and only one stream processor for writing data from the partition to a given storage tier. For example, as shown in the example of FIG. 6B, the new partitions 130A1 and 130A2 may be assigned to stream processor 140A1 and 140A2, respectively. In one embodiment, the original stream processor 140A that processed partition 130A may continue to process one of the new partitions 130A1 or 130A2, and, an additional stream processor may be assigned to process the other one of the new partitions. Each of the new partitions 130A1 and 130A2 may be represented in the hot tier 150A using a set of tiles that represent both spatial and temporal boundaries along a spatial dimension 602 and a temporal dimension 609. As shown in the example of FIG. 6B, stream processor(s) 140A may write time-series data from partition 130A1 to an open tile 610A13 that was preceded in time by a tile 610A12 that was preceded in time by a now-expired tile 610A11. Stream processor(s) 140A may also write time-series data from partition 130A2 to an open tile 610A23 that was preceded in time by a tile 610A22 that was preceded in time by a now-expired tile 610A21. Stream processor 140B may write time-series data from partition 130B to an open tile 610B8 that was preceded in time by a tile 610B7 that was preceded in time by a tile 610B6 that was preceded in time by a now-expired tile 610B5. Additionally, stream processor 140C may write time-series data from partition 130C to an open tile 610C4 that was preceded in time by a tile 610C3.

Figure 6C:
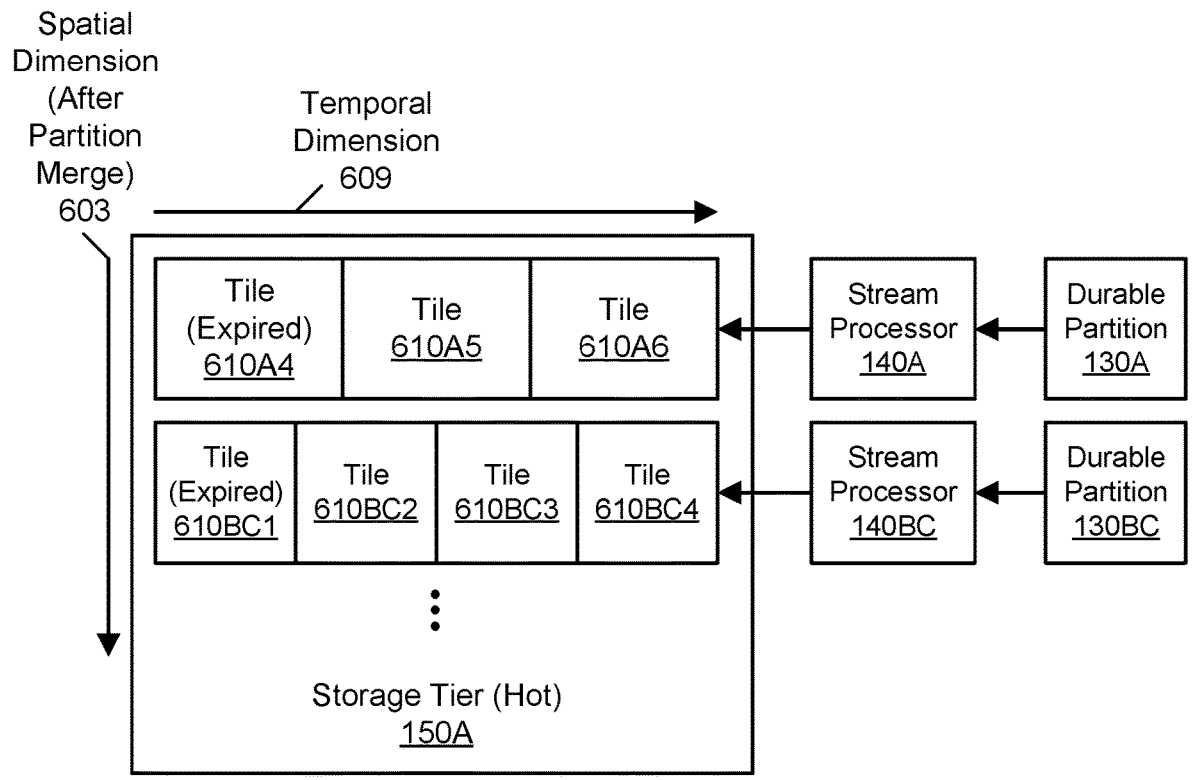
FIG. 6C illustrates an example of storage of time-series data using two-dimensional tiles in a hot tier after a partition merge, according to some embodiments.

FIG. 6C illustrates an example of storage of time-series data using two-dimensional tiles in a hot tier after a partition merge, according to some embodiments. As discussed above with respect to FIG. 5C, two ingestion partitions 130B and 130C may be merged into an ingestion partition 130BC. The ingestion partition merge may be carried forth into the stream processors 140 and storage tiers 150A-150N. For example, as shown in the example of FIG. 6C, the new partition 130BC may be assigned to a stream processor 140BC. As discussed above, a particular ingestion partition may be assigned to one and only one stream processor for writing data from the partition to a given storage tier. In one embodiment, the stream processor 140BC may represent the original stream processor 140B that processed partition 130B. In one embodiment, the stream processor 140BC may represent the original stream processor 140C that processed partition 130C. The merged partition 130BC may be represented in the hot tier 150A using a set of tiles that represent both spatial and temporal boundaries along a spatial dimension 603 and a temporal dimension 609. As shown in the example of FIG. 6C, stream processor 140A may write time-series data from partition 130A to an open tile 610A6 that was preceded in time by a tile 610A5 that was preceded in time by a now-expired tile 610A4. Stream processor 140BC may write time-series data from partition 130BC to an open tile 610BC4 that was preceded in time by a tile 610BC3 that was preceded in time by a tile 610BC2 that was preceded in time by a now-expired tile 610BC.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more ingestion routers of a time-series database, wherein the one or more ingestion routers are configured to:
        receive elements of time-series data from a plurality of clients; and
        divide the elements of time-series data into a plurality of non-overlapping partitions;
    one or more stream processors of the time-series database, wherein the one or more stream processors are configured to store, into one or more storage tiers of the time-series database, the elements of time-series data from the plurality of non-overlapping partitions; and
    a heat analyzer comprising one or more processors and a memory to store computer-executable instructions that, if executed, cause the one or more processors to:
        receive first heat data indicative of a resource usage of the time-series data at the one or more ingestion routers that divide the elements of the time-series data into the plurality of non-overlapping partitions;
        receive second heat data indicative of a resource usage of the time-series data at the one or more stream processors that store the elements of the time-series data into the one or more storage tiers of the time-series database;
        perform automated analysis of the first heat data and the second heat data; and
        based at least in part on the automated analysis of the first heat data and the second heat data, initiate a partition split of an individual one of the non-overlapping partitions into two or more partitions.

2. The system as recited in claim 1, wherein the elements of time-series data are spatially partitioned along non-overlapping spatial boundaries, and wherein the memory stores additional computer-executable instructions that, if executed, cause the one or more processors to:
    based at least in part on the first heat data and the second heat data, determine a split point for the partition split in the individual one of the non-overlapping partitions.

3. The system as recited in claim 1, wherein the first heat data and the second heat data represent partition-specific heat data over a window of time, wherein the first heat data and the second heat data are pushed to a durable data store, and wherein the first heat data and the second heat data are streamed to the heat analyzer by the durable data store.

4. The system as recited in claim 1, wherein the memory stores additional computer-executable instructions that, if executed, cause the one or more processors to:
    based at least in part on the analysis of the first heat data and the second heat data, initiate a merge of two or more of the non-overlapping partitions into a single partition.

5. A method, comprising:
    dividing, by a first set of one or more hosts, elements of time-series data into a plurality of partitions;
    storing, by a second set of one or more hosts into one or more storage tiers of a time-series database, the elements of time-series data from the plurality of partitions;
    receiving, by an analyzer, first data indicative of a resource usage of the time-series data at the first set of one or more hosts that divides the elements of the time-series data into the plurality of partitions;
    receiving, by the analyzer, second data indicative of a resource usage of the time-series data at the second set of one or more hosts that stores the elements of the time-series data into the one or more storage tiers of the time-series database; and
    initiating, by the analyzer, a split of an individual one of the partitions into two or more partitions, wherein the split is initiated based at least in part on analysis of the first data and the second data.

6. The method as recited in claim 5, wherein the elements of time-series data are spatially partitioned along non-overlapping spatial boundaries, and wherein the method further comprises:
determining, by the analyzer, a split point for the split in the individual one of the partitions, wherein the split point is determined based at least in part on the second data.

7. The method as recited in claim 5, wherein the first data and the second data represent partition-specific heat data over a window of time, wherein the first data and the second data are pushed to a durable data store, and wherein the first data and the second data are streamed to the analyzer by the durable data store.

8. The method as recited in claim 7, wherein the split is initiated by the analyzer without receiving heat data generated by one or more additional hosts of the time-series database over the window of time.

9. The method as recited in claim 5, wherein initiating the split comprises sending a split request from the analyzer to a control plane, and wherein the split is performed using the control plane.

10. The method as recited in claim 5, wherein the split is delayed based at least in part on a rate limit associated with partition splits in the time-series database.

11. The method as recited in claim 5, wherein the analysis of the first data and the second data comprises evaluation of one or more rules with respect to the first data and second data.

12. The method as recited in claim 5, wherein the first data and the second data represent additional elements of time-series data.

13. The method as recited in claim 5, further comprising:
initiating, by the analyzer, a merge of two or more of the partitions into a single partition, wherein the merge is initiated based at least in part on the analysis of the first data and the second data.

14. One or more non-transitory computer-readable storage media storing program instructions that, when executed on or across one or more processors, perform:
dividing, by one or more ingestion routers, elements of time-series data into a plurality of partitions, wherein the elements of time-series data are spatially partitioned along non-overlapping spatial boundaries;
storing, by one or more stream processors into one or more storage tiers of a time-series database, the elements of time-series data from the plurality of partitions;
receiving, by an analyzer, first data indicative of a throughput of the time-series data at the one or more ingestion routers that divides the elements of the time-series data into the plurality of partitions;
receiving, by the analyzer, second data indicative of a throughput of the time-series data at the one or more stream processors that stores the elements of the time-series data into the one or more storage tiers of the time-series database; and
initiating, by the analyzer, a split of an individual one of the partitions into two or more partitions, wherein the split is initiated based at least in part on analysis of the first data and the second data.

15. The one or more non-transitory computer-readable storage media as recited in claim 14, further comprising additional program instructions that, when executed on or across the one or more processors, perform:
determining, by the analyzer, a split point for the split in the individual one of the partitions, wherein the split point is determined based at least in part on the first data.

16. The one or more non-transitory computer-readable storage media as recited in claim 14, wherein the first data and the second data represent partition-specific heat data over a window of time, and wherein the first data and the second data are pushed to the heat analyzer.

17. The one or more non-transitory computer-readable storage media as recited in claim 14, wherein the split is delayed based at least in part on a rate limit associated with partition splits in the time-series database.

18. The one or more non-transitory computer-readable storage media as recited in claim 14, wherein the analysis of the first data and the second data comprises evaluation of one or more rules with respect to the first data and second data.

19. The one or more non-transitory computer-readable storage media as recited in claim 14, wherein the plurality of partitions, the first data, and the second data are stored using a durable data store, and wherein the first data and the second data are streamed to the analyzer from the durable data store.

20. The one or more non-transitory computer-readable storage media as recited in claim 14, further comprising additional program instructions that, when executed on or across the one or more processors, perform:
initiating, by the analyzer, a defragmentation of two or more of the partitions, wherein the defragmentation comprises one or more splits and one or more merges, and wherein the defragmentation is initiated based at least in part on the analysis of the first data and the second data.

* * * * *